Feb. 10, 1948.  A. W. WESSMAN  2,435,703
SHEAVE FEEDING AND BUTT CUTTING DEVICE FOR THRESHERS
Filed April 24, 1944  3 Sheets-Sheet 1
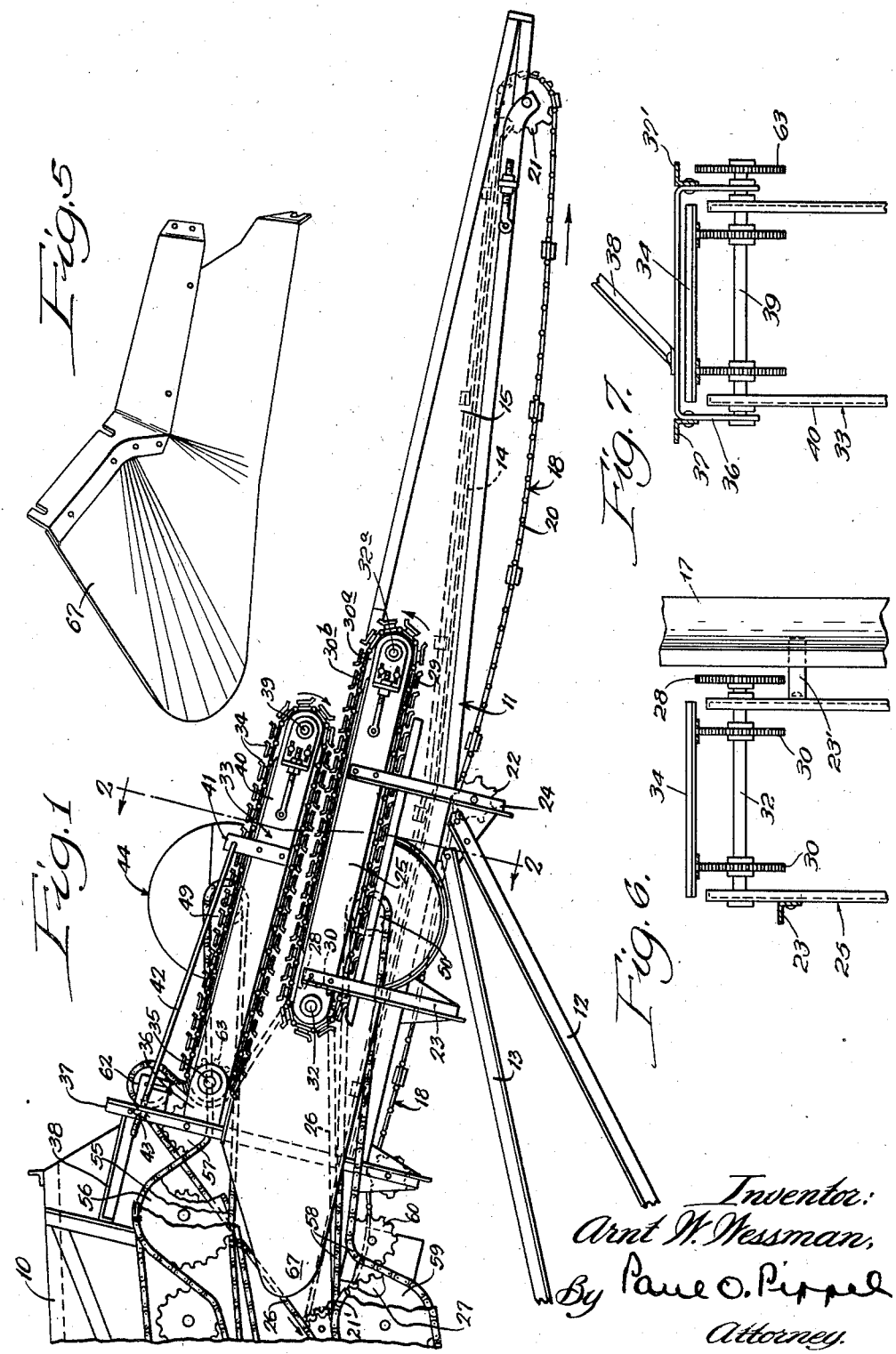
Inventor:
Arnt W. Wessman,
By Paul O. Pippel
Attorney.

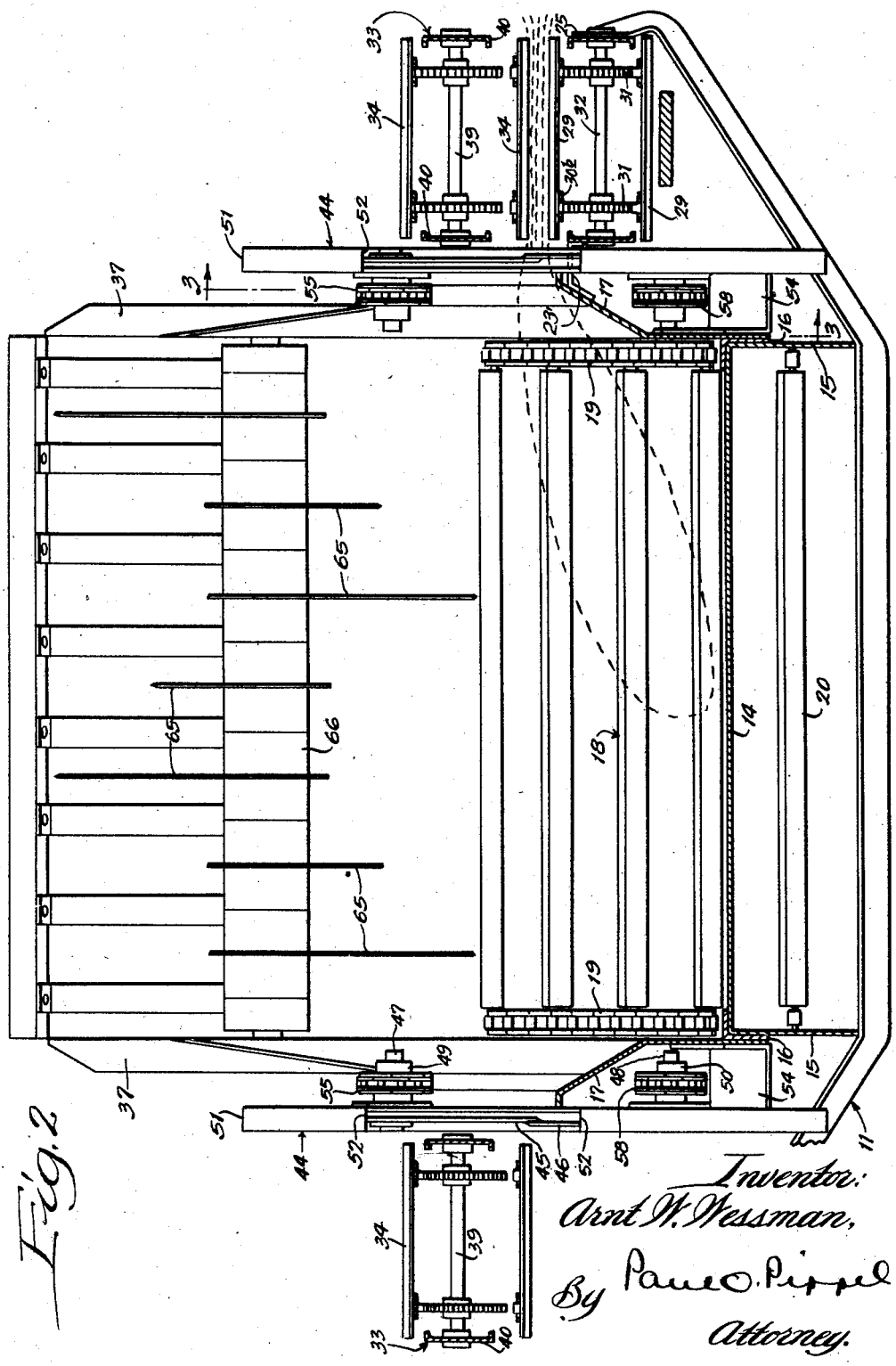

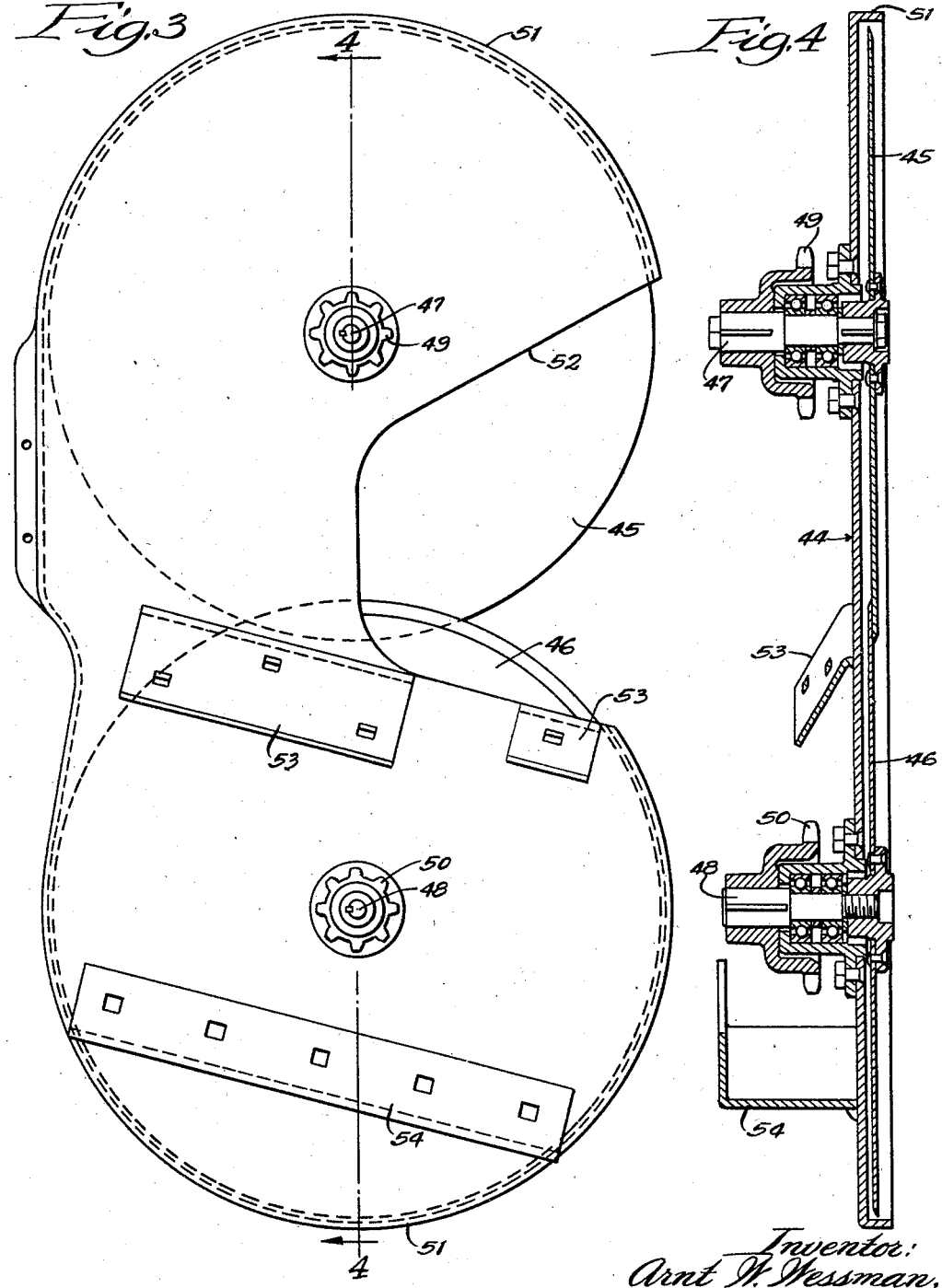

Patented Feb. 10, 1948

2,435,703

UNITED STATES PATENT OFFICE 2,435,703

SHEAVE FEEDING AND BUTT CUTTING DEVICE FOR THRESHERS

Arnt W. Wessman, Rock Island, Ill., assignor to International Harvester Company, a corporation of New Jersey Application April 24, 1944, Serial No. 532,439

3 Claims. (Cl. 146—81)

This invention relates to a sheave feeding and butt cutting device for threshing machines. More specifically, it relates to a device for handling sheaves being fed to a threshing machine.

In the cultivation of rice, the standard grain is cut and bound into bundles such as has been the common practice with most of the small grains. The bundles are shocked and left standing in the field until the grain is in condition for threshing. Usually the butts of the bundles are damp or wet when the grain is threshed. As wet straw reduces the capacity of a threshing machine, it is very desirable that the wet or damp portions of the bundles be removed before or as the bundles are fed to the threshing machine.

The principal object of the present invention is to provide a feed table and associated mechanism for feeding bundles of rice to a threshing machine and including with the feeding means cutting mechanism to sever the wet or damp ends of the bundles and discard the wet portion which would be detrimental to efficient threshing.

Another object is to provide a combined feeding and cutting means which is self-acting after the operator has placed the bundle in position to be engaged by the conveying means.

Another object is to provide and locate cutter knives in a position such that the operator is guarded from any danger during feeding of the machine.

Other objects, such as the floating nature of one of two cooperating conveyors to provide for bundles of different sizes, will be apparent from the detail description to follow.

In the drawings,

Figure 1 is a side elevation showing a feeding device incorporating the invention along with a feed table and its structural and drive connections with the body of a threshing device;

Figure 2 is a section taken on the line 2—2 of Figure 1;

Figure 3 is a section taken on the line 3—3 of Figure 2;

Figure 4 is a section taken on the line 4—4 of Figure 3;

Figure 5 is an enlarged perspective view of the deflector for the severed butts of the bundles shown in position on the machine in Figure 1;

Figure 6 is a horizontal section showing attaching means for the lower conveyor of Figure 1; and Figure 7 is a horizontal section showing attaching means for the upper conveyor of Figure 1.

In the harvesting of rice, a conventional threshing machine of any type may be utilized—that is, a stationary type, a tractor-drawn and operated machine, or a self-propelled machine. The bundles may be either placed directly in the feeding device for the machine as the machine is drawn or travels through the field, or the bundles may be hauled to the machine.

It is contemplated that the feeding device of the invention be considered of any general construction which may be used on any type of machine. In Figure 1 the material inlet end of the thresher 10 has been illustrated as well as several drive gears which form a part of the thresher and from which driving power is obtained for the driven mechanisms of the present invention. The construction illustrated may be in the nature of an attachment which is substituted for a harvester portion of a traveling machine, or it may be substituted for the feed table of a stationary thresher. The structure which supports the feeding device consists essentially of a downwardly-inclined frame structure 11, which is connected to the body 10 of the thresher and held rigidly in position by a plurality of braces 12 and 13. The framework of the feeding table may be of any suitable construction containing sufficient strength to support the mechanism and the bundles placed on the feed table for delivery to the machine.

As illustrated in the cross section of Figure 2, a sheet metal bottom 14 has turned-over and downwardly-extending side portions 15. Said bottom is connected to longitudinally-extending angle irons 16 which form a portion of the feed table and give strength to brace the table for supporting the feeding mechanism. Sheet metal side members 17 are also secured to the angle bars 16. Said side members extend upwardly and outwardly, as best shown in Figure 2. A conventional slot conveyor 18 carried by a pair of spaced chains 19 is fitted in the trough formed by the bottom 14 and the side walls 17. During operation of the machine said conveyor, which is of the endless type, passes upwardly over the bottom 14 and returns below the bottom, as indicated by the lower run 20 of the conveyor. As shown in Figure 1, each of the chains 19 passes over a sprocket 21 at the lower end of the feed table. An idler 22 is also shown for maintaining the center of the conveyor and holding the lower run of the conveyor against excessive downward movement. The upper end of the conveyor 18 is shown as being supported by sprocket 21', one of which is visible in Figure 1.

At each side of the feed table structure a pair of upright angle bars 23 and 24 provide means for supporting the outside of a conveyor framework 25. Said framework is fixed rigidly with respect to the feed table by members such as the member 23' in a position alongside the side wall 17 and extends slightly above said side wall. It will be noted that a drive consisting of a chain 26 is indicated in Figure 1 as extending from a sprocket 27 to a sprocket 28 carried by a shaft 32 rotatably mounted on the side members of the conveyor frame structure 25. Said chain also extends rearwardly to complete the drive circuit whereby means are provided for driving a conveyor 29 which extends around sprockets 30 on the shaft 32 and similar sprockets 30$^a$ carried on a shaft 32$^a$ at the lower end of the conveyor frame structure 25. This structure as described provides a conveyor which operates with its upper run moving upwardly alongside and substantially on the same level as the upper edge of the side wall 17. As the units at each side are identical, only one will be described, it being understood that a similar unit is provided at the other side as indicated in Figure 2.

Referring to Figure 2, it will be noted that the conveyor 29 is of the slatted type and is mounted on a pair of spaced chains 30$^b$ which extend over the sprockets 30 mounted on the transverse shaft 32, said shaft being journaled in suitable bearings on the frame members 25 of the lower conveyor frame structure. It will be noted that the conveyor 29 extends a substantial distance downwardly along the platform. This structure is provided to secure an engagement with sheaves of rice when they are laid on the feeding table and carried or pushed only a slight distance toward the feeding mechanism.

An upper conveyor assembly, consisting essentially of a frame structure 33 and a conveyor 34 carried thereby, is pivotally mounted on a shaft 35 which is carried by extensions 36 secured to angle-bar upright members 37 and 37'. Said members are in turn secured by an angle bar 38 and other means not shown so as to be rigidly supported on the frame structure of the feed table. The frame structure 33 is almost identical with the lower frame structure 25. The conveyor 34 is carried on sprockets on the shaft 35 at one end and on sprockets on a shaft 39 at the other end. The shaft 39 is journaled in the side members 40 of the frame structure.

An upright member 41, secured to the frame structure 33, provides attaching means for a rod 42 which slidably extends through an opening in the upright member 37. A stop collar 43, adjustably secured to the rod 42, provides lost motion means for holding the frame structure 33 against downward movement and permits upward swinging of the frame structure upon the passage of a sheaf between the two conveyors. It will be noted that the upper conveyor is driven with its lower run moving upwardly in the same direction as the upper run of the lower conveyor 29.

A knife-supporting structure 44 is secured to the feed table between the conveyors and the side members 17 of the feed table. As best shown in Figures 3 and 4, the knife-supporting structure provides means for journaling two disk type knives 45 and 46 respectively on short stub shafts 47 and 48. Drive sprockets 49 and 50 provide means for rotating the knives. It will be noted that the supporting structure also forms a housing for the knives, having a marginal portion 51 which overhangs the cutting edges of the knives.

An opening 52 is formed at one side of the supporting structure to permit bundles to pass into the shearing portions of the blades. It will be noted that the blades overlap and contact each other to provide a rotating and shearing action which is very effective in cutting material fed to the knives. Brackets 53 and 54 on the knife-supporting structure 44 provide means for securing the structure to the side member of the feed table. As shown in Figure 1, a drive chain 55 extends over a sprocket 56 on the thresher body under a sprocket 57 on the member 37 and therefrom over the sprocket 49 to provide driving means for the upper knife. A driving chain 58 extends forwardly from a sprocket 59 around the sprocket 50 to provide driving means for the lower knife, and therefrom over an idler sprocket 60. The specific arrangement of the knives has not been shown completely as it is necessary only in so far as the present invention is concerned to illustrate a means for driving the functionally cooperating mechanisms. The drive chain 26 is illustrated as passing upwardly over a sprocket 62, then around a sprocket 63 on the drive shaft 35 for driving the upper conveyor, then around the sprocket 28 for driving the lower conveyor, and therefrom back to a source of driving power not shown in this disclosure.

As the bundles are laid on the feed table, the conveyor 18 acts to carry them upwardly towards the throat of the thresher. The bundles are laid so that the wet butt ends are engaged by the lower conveyor 29 and carried forwardly to be subsequently engaged also by the upper conveyor 34. The upper conveyor floats upwardly if necessary to accommodate the butt of the sheaf or bundle which is carried forwardly into the throat of the knife-supporting structure, at which point the bundle is severed by the knives. The head portion of the bundle, which contains the grain, is then carried into the feeder mechanism of the thresher, a portion of which is indicated in Figure 2, the knives 65 being shown mounted on a rotating feeder structure 66. As the conveyors carry the severed butts rearwardly, they are discharged and thrown outwardly and downwardly by a curved sheet metal deflector 67. Figure 5 shows the deflector removed from the machine in order to show the two-direction curvature which deflects the butts out of the working mechanism of the machine and onto the ground.

As previously stated, the mechanism at both sides is substantially the same. It may be adequate for some types of machine to have only a cutting mechanism at one side of the feed table. It is preferable, however, for a large capacity machine to have the cutting means at each side of the feed table.

It is to be understood that applicant has shown and described only a preferred embodiment of his improved feeding and butt-severing means for bundles or sheaves being fed to a threshing machine, and that he claims as his invention all modifications falling within the scope of the appended claims.

What is claimed is:

1. In a sheaf feeding and butt removing device for thrashing mechanism having an inclined feed table having upwardly extending side members and an upwardly delivering feeding means thereon between said side members, the combination of frame structure mounted at the side of the table, an upwardly inclined conveyor mounted on said frame structure, the upper run of said conveyor being alongside and above the feed table and on substantially the same level as the upper edge of the adjacent side members, a conveyor support mounted above said conveyor, said support being mounted for movement of its lower end away from and toward said conveyor, a second conveyor extending around said support with its lower run being above the upper run of the lower conveyor, means for holding said support against downward movement to maintain it in spaced relation with respect to the lower conveyor, said means having a lost motion connection whereby the support and its conveyor may move upwardly upon the feeding of sheaves between the conveyors, means for driving said conveyors with the adjacent runs traveling at the same speed in an upward direction, a knife supporting structure mounted between said conveyors and the feeding means, and a rotary knife journaled on said structure, said knife being arranged and constructed with its cutting surface spanning the vertical space between the two conveyors.

2. In a sheaf feeding and butt removing device for thrashing mechanism having an inclined feed table having upwardly extending side members and an upwardly delivering feeding means thereon between said side members, the combination of frame structure mounted at the side of the table, an upwardly inclined conveyor mounted on said frame structure, the upper run of said conveyor being alongside and above the feed table and on substantially the same level as the upper edge of the adjacent side members, a conveyor support mounted above said conveyor, said support being pivotally mounted at its upper and forward end for movement of its lower end away from and towards said conveyor, a second conveyor extending around said support with its lower run being above the upper run of the lower conveyor, means for holding said support against downward movement to maintain it in spaced relation with respect to the lower conveyor, said means having a lost motion connection whereby the support and its conveyor may move upwardly upon the feeding of sheaves between the conveyors, means for driving said conveyors with the adjacent runs traveling at the same speed in an upward direction, a knife supporting structure mounted between said conveyors and the feeding means, a pair of rotary knives journaled on said structure, said knives having overlapping portions to provide a shearing action in a location intermediate the two conveyors, means for driving said knives, said supporting structure extending over and shielding the knives, a portion thereof being cut away in the vicinity of the overlapping portions to provide for the entrance of sheaves to be cut.

3. In a sheaf feeding and butt removing device for thrashing mechanism having an inclined feed table having upwardly extending side members and an upwardly delivering feeding means thereon between said side members, the combination of frame structures mounted at each side of the table, an upwardly inclined conveyor mounted on each of said frame structures, the upper runs of said conveyors being alongside and above the feed table and on substantially the same level as the upper edge of the adjacent side members, a conveyor support mounted above each of said conveyors, said supports being pivotally mounted at their upper and forward ends for movement away from and towards said conveyors, a second pair of conveyors extending around said supports with their lower runs being above the upper runs of the lower conveyors, means for holding said supports against downward movement to maintain them in spaced relation with respect to the lower conveyors, said means having lost motion connections whereby the supports and their conveyors may move upwardly upon the feeding of sheaves between the upper and lower conveyors, means for driving said conveyors with the adjacent runs traveling at the same speed in an upward direction, knife supporting structures mounted between said set of conveyors and the feeding means, a pair of rotary knives journaled on each structure, said knives having overlapping portions to provide a shearing action in a location intermediate the adjacent conveyors, and means for driving said knives, the supporting structures for the knives extending over and shielding the knives, portions being cut away in the vicinity of the overlapping portions thereof to provide for the entrance of sheaves to be cut.

ARNT W. WESSMAN.

REFERENCES CITED

The following references are of record in the file of this patent:

UNITED STATES PATENTS

| Number | Name | Date |
| --- | --- | --- |
| 158,638 | Hinton | Jan. 12, 1875 |
| 779,855 | Killinger | Jan. 10, 1905 |
| 1,077,230 | Pierce | Oct. 28, 1913 |
| 1,092,735 | Meeks | Apr. 7, 1914 |
| 1,456,624 | Davis | May 29, 1923 |
| 1,756,788 | Hale | Apr. 29, 1930 |